United States Patent

[11] 3,602,738

[72] Inventor John Bohm
Montreal, Quebec, Canada
[21] Appl. No. 818,944
[22] Filed Apr. 24, 1969
[45] Patented Aug. 31, 1971
[73] Assignee Northern Electric Company, Limited
Montreal, Quebec, Canada

[54] ELECTRONIC SWITCH
7 Claims, 7 Drawing Figs.

[52] U.S. Cl. .......... 307/251,
307/244, 307/304, 307/311
[51] Int. Cl. .......... H03k 17/00
[50] Field of Search .......... 307/251,
241, 242, 243, 244, 254, 311; 328/105, 153

[56] References Cited

UNITED STATES PATENTS 3,153,729 10/1964 Leakey .......... 307/254
3,386,053 5/1968 Priddy .......... 307/251
3,486,821 12/1969 Westhaver .......... 307/311

*Primary Examiner*—Donald D. Forrer
*Assistant Examiner*—B. P. Davis
*Attorney*—Rogers, Bereskin & Parr

ABSTRACT: An electronic switch having three identical metal oxide semiconductor field effect transistors (MOS-FET's), to replace a mechanical relay. The sources of the first and second MOS-FET's are connected together as a common input, and their drains constitute first and second outputs. The gates of the first and third MOS-FET's are connected to a common control point. Normally the second MOS-FET is biased on and the first and third are off, connecting the input to the second output. Application of a voltage to the control point turns the first and third MOS-FET's on, and a circuit through the third MOS-FET shunts the bias voltage applied to the second MOS-FET, shutting the latter off. This disconnects the input from the second output and connects it instead to the first output. For additional outputs, the first and second MOS-FET's are each replaced by several MOS-FET's in parallel.

INVENTOR

JOHN BOHM

By

Rogers, Bereskin & Parr

INVENTOR
JOHN BOHM
By
Rogers, Bereskin & Parr

INVENTOR
JOHN BOHM
By
Rogers, Bereskin & Parr

ELECTRONIC SWITCH

This invention provides an electronic switch which constitutes a solid-state alternative to a conventional mechanical relay. The switch provided by the invention may be used in various types of switching applications.

In many switching applications, for example in telephone exchanges, it has been common practice to use mechanical relays, of the type having relay coils which open and close mechanical contacts. The advantage of such mechanical relays is that they provide a very low impedance path between the input and the desired output, and a virtually complete open circuit between the input and the nonselected output. They also provide virtually complete isolation between the control current (which acts on the relay coil) and the switched currents, which are controlled by the relay contacts. However, mechanical relays are relatively expensive to construct, and they are quite bulky in physical size, and they are extremely slow acting as compared with the speed of most electronic circuits.

Accordingly, various attempts have been made to provide electronic switches which are fast acting and which can be fabricated fairly cheaply in small sizes. Typical examples of such attempts are shown in U.S. Pats. Nos. 2,864,961 to Lohman et al., and 3,183,364 to Pickering. However, these prior art attempts, which use conventional transistors, suffer from the defect that the control signal is not isolated from the signal being switched. This is because of their use of conventional transistor circuits, in which the control current is applied to the base or emitter of the transistor and actually forms part of the collector current which represents the output or switched signal of the transistor.

Accordingly, it is an object of the present invention to provide a simple and relatively economical electronic switch in which the control signal is better isolated from the signals being switched. In a typical electronic switch according to the invention this is accomplished by providing a. first and second switch means each having a signal input, a signal output, and a control input, said control input being electrically insulated from said signal input and from said signal output, each switch means having an on state in which its signal input and signal output are connected by a low impedance path, and an off state in which its signal input and signal output are separated by a high impedance path, said first switch means assuming one of its states on application of a first control signal to its control input and the other of its states upon application of a second control signal to its control input, said second switch means assuming one of its states upon application of a third control signal to its control input and the other of its states upon application of a fourth control signal to its control input, b. means connecting together said signal inputs for application thereto of an input signal to be switched, c. means for applying one of said first and second control signals to the signal input of said first switch means to bias it to one of its states, and means for applying one of said third and fourth control signals to the signal input of said second switch means to bias it to a state opposite that of said first switch means, so that said input signal will be connected to the output of one of said switch means by a low impedance path and will be separated from the output of the other of said switch means by a high impedance path, d. and means for selectively applying the other of said first and second control signals to the control input of said first of switch means and the other of said third and fourth signals to the control input of said second switch means, so that said input signal will then be connected to the output of said other switch means by a low impedance path and will be separated from the output of said one switch means by a high impedance path.

Further objects and advantages of the invention will appear from the following description, taken together with the accompanying drawings, in which.

Figure 1:
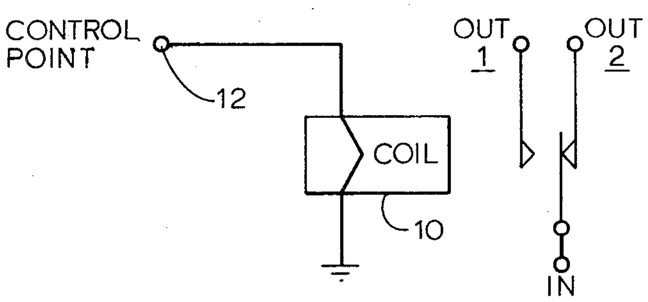
FIG. 1 is a diagrammatic view of a conventional prior art mechanical relay.

Reference is first made to FIG. 1, which shows a conventional mechanical relay having a coil 10 connected to control point 12, a pair of fixed contacts OUT 1 and OUT 2, and a movable contact IN. Contact IN is normally in contact with contact OUT 2, but when the relay coil 10 is energized by application of a control current to control point 12, then contact IN moves over to contact OUT 1, thereby disconnecting the input from one output and connecting it instead to the other output. In such a mechanical relay, the signal applied at the control point 12 is virtually completely isolated from the input and from both outputs.

Figure 2:
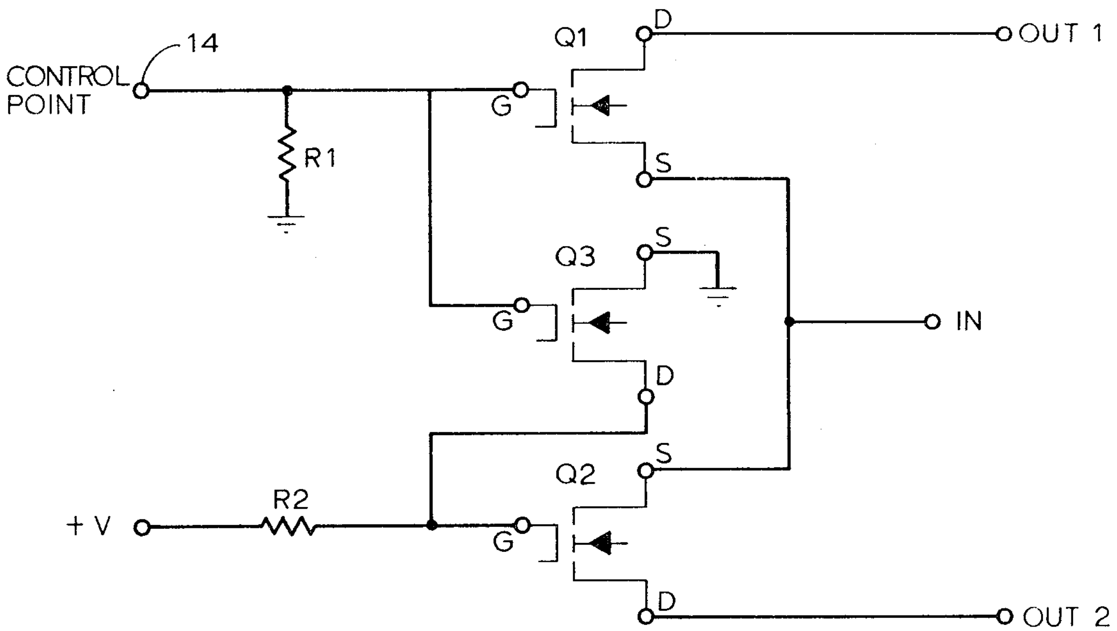
FIG. 2 is a circuit showing an electronic switch according to the invention to replace the relay of FIG. 1.

Reference is next made to FIG. 2, which shows a solid-state equivalent of the FIG. 1 relay. The FIG. 2 circuit employs three metal oxide semiconductor field effect transistors (MOS-FET's) Q1, Q2 and Q3. These are devices having an insulating layer between the gate and the switched region, thereby providing good isolation between the gate and the switched region so long as the voltage difference between them does not exceed the breakdown voltage of the insulation.

It is assumed that transistors Q1 to Q3 are all N channel enhancement devices. Enhancement-type devices are ones which have a high impedance between their source and drain without biasing and require biasing for low impedance. When the enhancement-type devices are N channel, they require positive voltage biasing at their gates for low impedance; application of ground or a negative voltage to their gates results in a very high impedance between source and drain. If the enhancement type devices were P channel, then they would require a negative voltage at their gates for low impedance. In the drawings, a solid or interrupted line in the channel indicates depletion and enhancement types respectively, and an arrow towards or away from the channel indicates N or P conductivities respectively. The letters G, S and D indicate gate, source and drain respectively.

In the FIG. 2 circuit the sources of transistors Q1 and Q2 are connected together and to an input terminal IN, and the drains of transistors Q1 and Q2 are connected respectively to output terminals OUT 1 and OUT 2. The gates of transistors Q1 and Q3 are connected together to a control point 14 and are also grounded through a resistor R1. The source of transistor Q3 is grounded and its drain is connected to the gate of transistor Q2 at a terminal 16. Terminal 16 is connected through a resistor R2 to a source of positive bias voltage +V.

The operation of the FIG. 2 circuit is as follows. Normally, ground is connected to the gates of transistors Q1 and Q3 through resistor R1, biasing these transistors to their high impedance states. In this situation, input IN is disconnected from output OUT 1, and ground at the source of transistor Q3 is disconnected from terminal 16. At the same time, the positive bias voltage +V is applied through resistor R2 to the gate of transistor Q2, forward biasing it so that input IN is connected to output terminal OUT 2. In short, the situation is similar to that shown for the mechanical relay of FIG. 1.

When a positive voltage is applied to the control point 14, this forward biases transistors Q1 and Q3, placing them in their low impedance state. This connects input IN to output OUT 1 through transistor Q1. At the same time, transistor Q3, being on, connects ground from its source to terminal 16 and the gate of transistor of Q2. This places transistor Q2 in its high impedance state, disconnecting input IN from output OUT 2, Conditions return to their original state if the positive voltage at control point 14 is removed.

Because of the very high impedance of the transistors used, the circuit of FIG. 2 provides fairly good disconnection of the input IN from the undesired output, and at the same time provides a very low impedance connection between the input and the selected output. In addition, because of the insulation layer between the gate and the source-drain region of the transistors, the control signal is effectively isolated from both the inputs and the outputs.

To provide a solid-state relay with two sets of contacts, one simply replaces each of transistors Q1 and Q2 by two transistors in parallel. Transistor Q3 remains as it is. In general, where N sets of contacts are needed, the number of transistors required will be 2N+1 (the one transistor being Q3).

Figure 3:
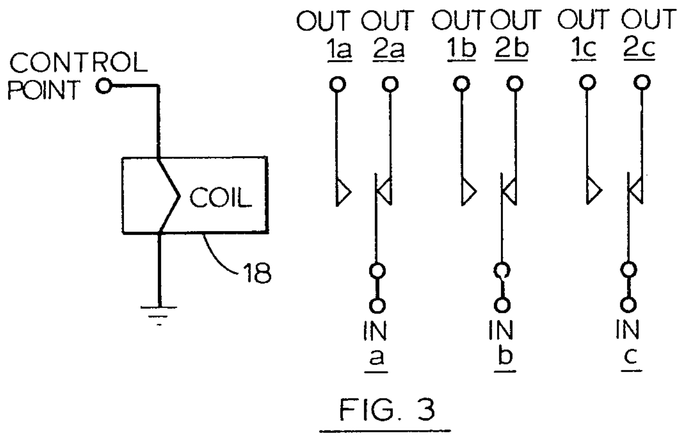
FIG. 3 is a diagrammatic view of a conventional prior art mechanical relay having several contacts.

For example, FIG. 3 shows diagrammatically a conventional mechanical relay having three sets of fixed contacts OUT 1*a*, OUT 2*a*, OUT 1*b*, OUT 2*b*, OUT 1*c*, OUT 2*c*, and three movable contacts IN *a*, IN *b*, IN *c*. When the relay coil 18 is deenergized, movable contacts IN *a*, IN *b*, IN *c* are connected respectively to output contact OUT 2*a*, OUT 2*b*, and OUT 2*c*, whereas when the relay is energized, the input contacts are connected to the other set of output contacts and are disconnected from the first set of output contacts.

Figure 4:
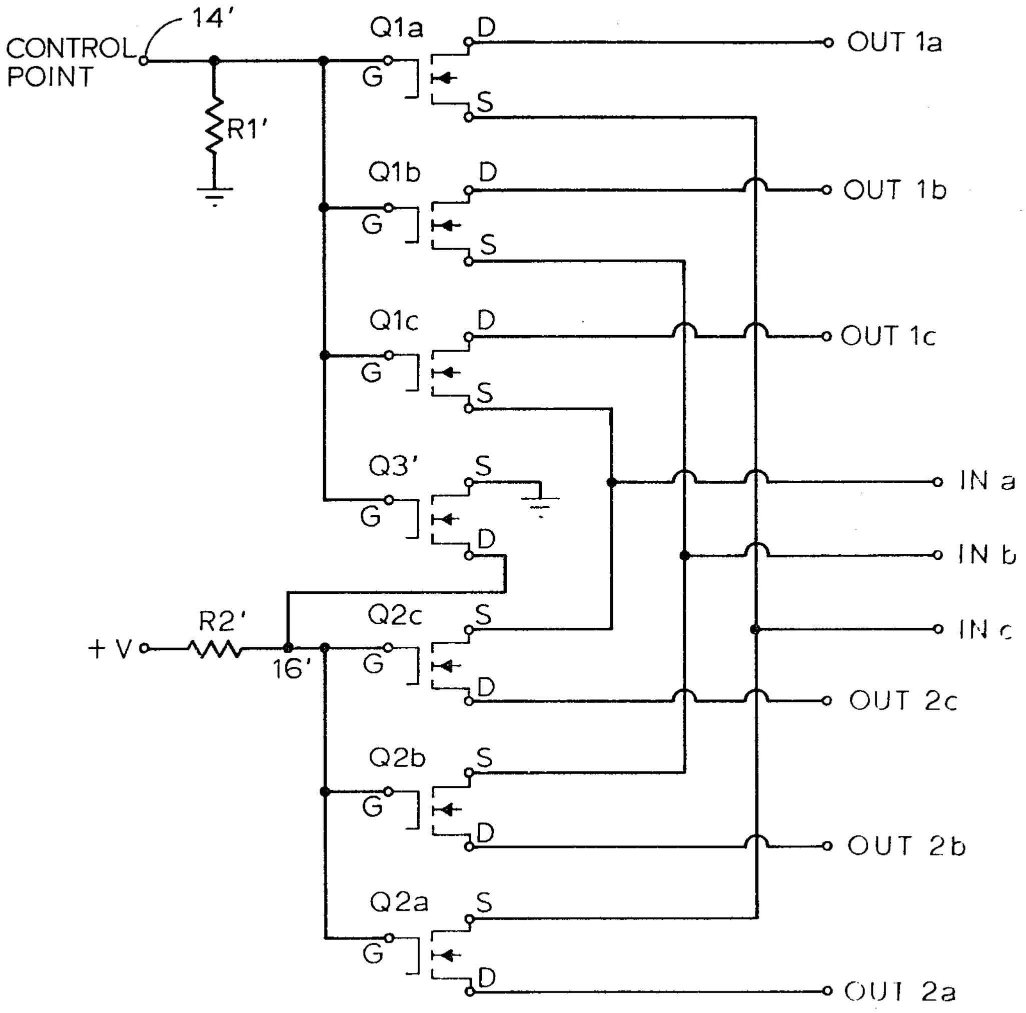
FIG. 4 is a circuit showing another electronic switch according to the invention to replace the relay of FIG. 3.

FIG. 4 shows a solid-state equivalent of the FIG. 3 relay. As shown transistor Q1 of FIG. 2 has now become three transistors Q1*a*, Q1*b*, Q1*c* connected in parallel, and the same change has been made to transistor Q2. Transistor Q3′ is the same as transistor Q3 in FIG. 2. The biasing arrangements remain the same as those for FIG. 2.

Normally, with no bias applied to the control point 14′, inputs IN *a*, IN *b*, IN *c* are connected to outputs OUT 2*a*, OUT 2*b*, OUT 2*c* and are disconnected from the other three outputs. When a positive voltage is applied to control point 14′, this switches transistors Q1*a*, Q1*b*, Q1*c* to their low impedance state, so that the inputs are connected to the outputs from these transistors. At the same time, the positive voltage at the control point switches transistors Q3′ to its low impedance state, connecting ground from the source of transistor Q3′ to the gates of transistors Q2*a*, Q2*b*, Q2*c*. This places these last three transistors in their high impedance state to disconnect the inputs from the outputs of these last three transistors.

There is no theoretical limitation to the number of multiple contacts which can be provided, either simple make or break contacts, or transfer contacts. The practical limitations depend on the fan-out capacity of the driving source connected to the control point, and on the fan-out capacity of transistor Q3′. However, the fan-out capacity of transistor Q3′ can be increased by using several transistors connected in parallel in place of transistor Q3′.

The invention does not provide quite as high an impedance between normally open contacts, or quite as low an impedance between normally closed contacts, as does a conventional mechanical relay, but it does provide close approximations of these and has the advantage of much faster operation and low cost, particularly when fabricated in integrated circuit form.

Although the MOS-FET transistors illustrated have been assumed to be enhancement-type N channel devices, P channel devices could be used with appropriate changes in the polarity of the biasing voltages. Alternatively, instead of enhancement-type MOS-FET's, depletion type MOS-FET's can be used. These have low impedance without bias and have high impedance with reverse bias. In addition, a third category of devices may be used, namely depletion-enhancement MOS-FET's. These devices have a medium impedance with no bias applied, and the impedance decreases with forward bias and increases with reverse bias. Again, the depletion-type devices, and the depletion-enchancement-type devices, can be either N channel or P channel, depending on the polarity of bias and control voltages desired by the circuit designer. In the appended claims, the transistor-type (enhancement, depletion, or depletion-enhancement) will be referred to as the mode of operation, and the term "conductivity-type" will be used to refer to the transistors as being either N channel or P channel.

Figure 5:
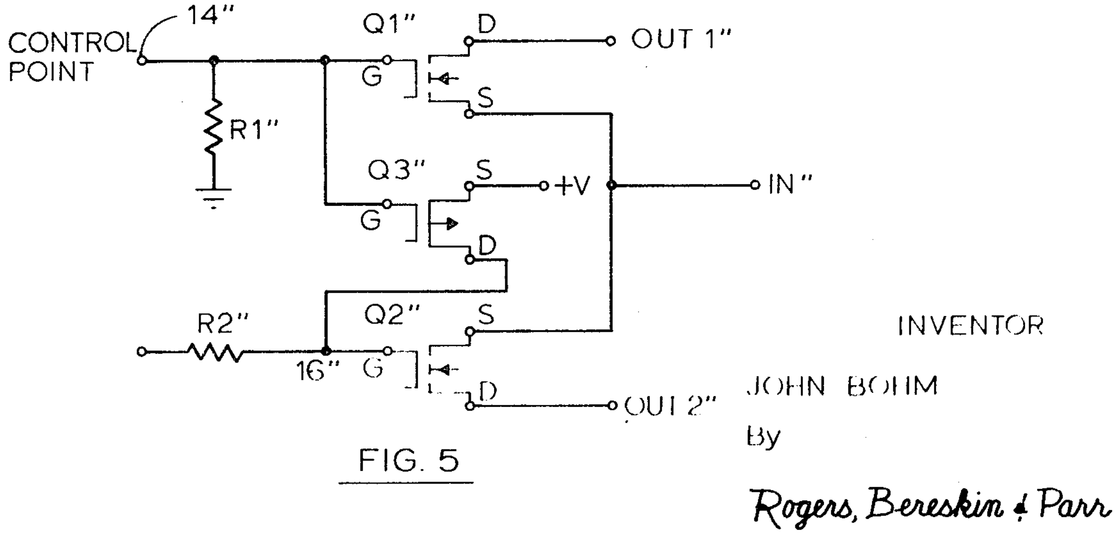
FIG. 5 is a circuit showing a modification of the FIG. 2 circuit.

More than one type of MOS-FET can be used in a single relay, as indicated in FIG. 5 where double primed reference numerals indicate parts corresponding to those of FIG. 2. In the FIG. 5 device, transistors Q1″ and Q2″ are the same mode of operation and conductivity-type as in FIG. 2, namely N channel enhancement devices, requiring positive biasing at their gates for low impedance. Ground or negative voltage at their gates places them in a high impedance state. However, transistor Q3″ is a P channel depletion-type device, requiring ground or a negative voltage at its gate for low impedance. A positive voltage at its gate places transistor Q3″ in its high impedance state.

In the situation shown in FIG. 5, with no voltage applied to the control point 14″, transistor Q1″ is off, disconnecting input IN″ from output OUT 1″. Transistor Q3″ is on, connecting positive voltage +V to the gate of transistor Q2″ to turn this transistor on, connecting the input IN″ to output OUT 2″.

When a positive voltage is applied at the control point 14″, this turns transistor Q1″ on and at the same time it turns transistor Q3″ off, permitting ground to reach terminal 16″ through resistor R2″ to turn transistor Q2″ off. This disconnects the input IN″ from output OUT 2″ and connects it instead to output OUT 1″.

Figure 6:
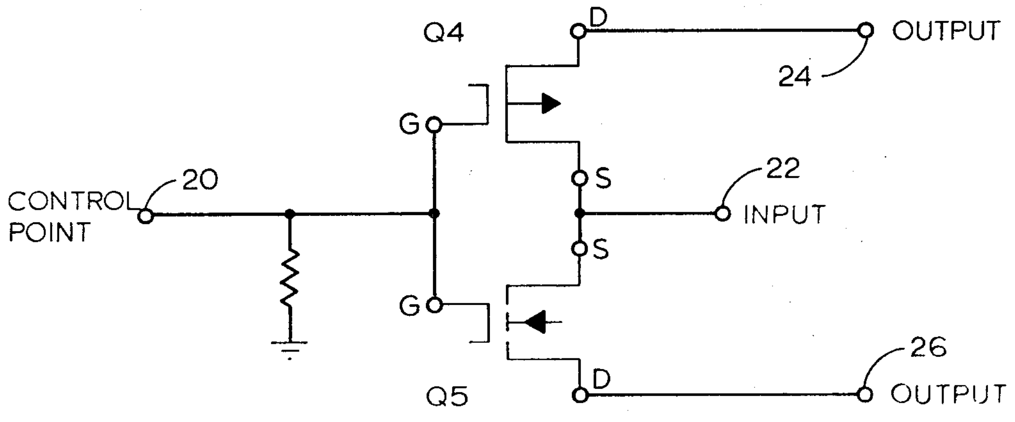
FIG. 6 is a circuit showing another modification of the invention.

As an alternative to the FIG. 5 circuit, the FIG. 6 circuit could be used. In FIG. 6, only two transistors Q4 and Q5 are provided. Transistor Q4 is a P channel depletion-type which conducts with ground or a negative voltage applied to its gate and blocks when a positive voltage is applied to its gate. Transistor Q5 is an N channel enhancement device which conducts with a positive bias voltage and blocks with ground or a negative voltage applied to its gate. The gates of both transistors are connected to a common control point 20.

When no voltage is applied to control point 20, transistor Q4 conducts and transistor Q5 is off, so that input 22 is connected to output 24. A positive voltage at the control point results in connection of input 22 to output 26 instead of to output 24.

A disadvantage of the FIGS. 5 and 6 circuits is that they would be far more complicated to fabricate in integrated circuit form than would the FIGS. 1 to 4 circuits. In general, use of only one kind of MOS-FET is preferred, since this enables simple fabrication of the circuit in integrated form, thus enabling low costs so that the relay of the invention can compete with conventional mechanical relays. A large number of MOS-FET's can be produced on one slice of material, and the required relay configuration can be achieved by applying the required interconnection pattern.

Figure 7:
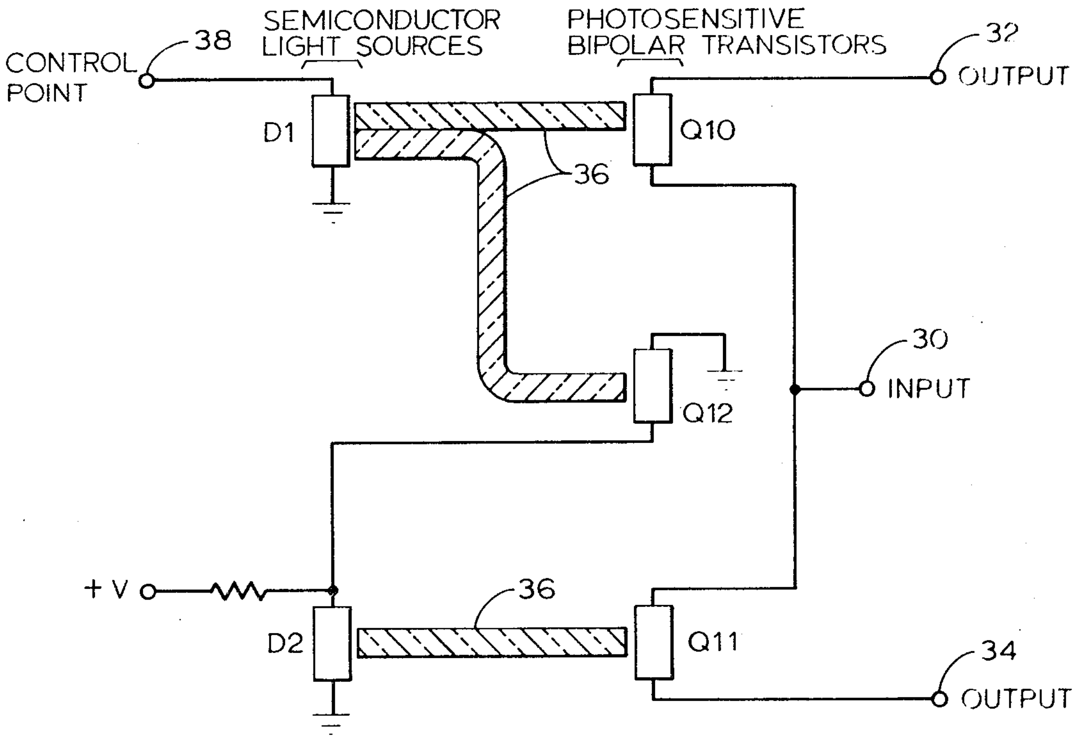
FIG. 7 is a circuit showing still another modification of the invention.

A further modification of the invention is shown in FIG. 7, which uses much the same circuit configuration as FIG. 2 but with isolation provided by light coupling. In FIG. 6, three photosensitive bipolar transistors Q10, Q11, Q12 are used. These transistors conduct when exposed to light and otherwise have a high impedance. Transistors Q10, Q11 have a common input 30 and respective outputs 32, 34. Semiconductor light sources D1, D2 (typically of galium arsenide) are provided, optically coupled to transistors Q10, Q11, Q12 through light fibers 36. As in FIG. 2, source D2 normally biases transistor Q11 to an conducting state, connecting input 30 to output 34. Source D1 is normally off and transistors Q10, Q12 are nonconducting. When source D1 is energized by a voltage applied to control point 38, this switches transistors Q10, Q12 to a conducting state, and this shuts off source D2, turning transistor Q11 off. The input then becomes connected to output 32 instead of output 34. In this embodiment, the light sources D1 and D2 and the light fibers connecting them to the transistors Q10, Q11, Q12 perform the same function as the gates of the MOS-FET's. Transistor Q10, for example, with its light fiber and diode D1, may be considered to be a switching device in which diode D1 and its light fiber constitute the control input.

What I claim as my invention is:

1. An electronic switch comprising a. first and second switch means each having a signal input, a signal output, and a control input, said control input being electrically insulated from said signal input and from said signal output, each switch means having an on state in which its signal input and signal output are connected by a low impedance path, and an off state in which its signal input and signal output are separated by a high impedance path, said first switch means assuming one of its states on application of a first control signal to its control input and the other of its states upon application of a second control signal to its control input, said second switch means assuming one of its states upon application of a third control signal to its control input and the other of its states upon application of a fourth control signal to its control input, b. means connecting together said signal inputs for application thereto of an input signal to be switched, c. means for applying one of said first and second control signals to the control input of said first switch means to bias it to one of its states, and means for applying one of said third and fourth control signals to the control input of said second switch means to bias it to a state opposite that of said first switch means, so that said input signal will be connected to the output of one of said switch means by a low impedance path and will be separated from the output of the other of said switch means by a high impedance path, d. and means for selectively applying the other of said first and second control signals to the control input of said first switch means and the other of said third and fourth signals to the control input of said second switch means, so that said input signal will then be connected to the output of said other switch means by a low impedance path and will be separated from the output of said one switch means by a high impedance path, e. said means including third switch means having a control input, a signal input, and a signal output, said third switch means having an on state in which its signal input and signal output are connected by a low impedance path and having an off state in which its signal input and signal output are separated by a high impedance path, means connecting the control input of said third switch means with the control input of said first switch means, said third switch means assuming one of its states upon application of said first control signal thereto and the other of its states upon application of said second control signal thereto, so that when the control signal at the control input of said first switch means is switched from one of said first and second control signals to the other of said first and second control signals to switch the state of said first switch means, the state of said third switch means will simultaneously be switched; means for connecting the signal input of said third switch means to a source of one of said third and fourth signals, and means connecting the signal output of said third switch means to the control input of said second switch means, so that when the state of said first and third switch means is switched, said third switch means will effect switching of the state of said second switch means to maintain said second switch means in a state opposite that of said first switch means.

2. An electronic switch according to claim 1 including a plurality of said first switch means having their control inputs connected together, and a plurality of said second switch means having their control inputs connected together, one second switch means associated with each first switch means, the signal inputs of corresponding first and second switch means being connected together.

3. An electronic switch according to claim 1 wherein said first and second switch means are field effect transistors, said control inputs being the gates of said transistors, said gate of each transistor being insulated from the signal input and signal output of such transistor.

4. An electronic switch according to claim 3 wherein the gates of said transistors are connected together and to a common control point, said transistors being of conductivity types such that one assumes its on state, and the other its off state when a predetermined voltage is applied to said control point, and such that the states of said transistors reverse when a second predetermined voltage is applied to said control point.

5. An electronic switch according to claim 1 wherein said first, second and third switch means are each metal oxide semiconductor field effect transistors of the same mode of operation.

6. A switch according to claim 1 wherein said first, second and third switch means are metal oxide semiconductor field effect transistors of the same mode of operation and of the same conductivity type.

7. An electronic switch according to claim 1 wherein said first and second switch means are light sensitive devices having their on state when exposed to light and their off state when shielded from light, the control input of each said device including a light generating source, and optical path means extending between said light sensitive device and its associated light generating source.